US010924721B2

(12) United States Patent
Rivas Perpen et al.

(10) Patent No.: US 10,924,721 B2
(45) Date of Patent: Feb. 16, 2021

(54) VOLUMETRIC VIDEO COLOR ASSIGNMENT

(71) Applicant: Intel Corporation, Santa Clara, CA (US)

(72) Inventors: Daniel Rivas Perpen, Manhattan Beach, CA (US); Diego Prilusky, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 92 days.

(21) Appl. No.: 16/227,577

(22) Filed: Dec. 20, 2018

(65) Prior Publication Data

US 2019/0124317 A1     Apr. 25, 2019

(51) Int. Cl.
| | |
|---|---|
| G06T 19/00 | (2011.01) |
| H04N 13/15 | (2018.01) |
| G06T 7/90 | (2017.01) |
| H04N 13/243 | (2018.01) |
| H04N 13/111 | (2018.01) |
| G06T 11/00 | (2006.01) |
| G06T 19/20 | (2011.01) |

(52) U.S. Cl.
CPC .............. *H04N 13/15* (2018.05); *G06T 7/90* (2017.01); *G06T 11/001* (2013.01); *G06T 19/20* (2013.01); *H04N 13/111* (2018.05); *H04N 13/243* (2018.05); *G06T 2207/10028* (2013.01); *G06T 2219/2012* (2013.01)

(58) Field of Classification Search
CPC combination set(s) only.
See application file for complete search history.

(56) References Cited

U.S. PATENT DOCUMENTS

| | | |
|---|---|---|
| 6,489,955 B1 | 12/2002 | Newhall, Jr. |
| 6,501,471 B1 | 12/2002 | Venkataraman et al. |
| 6,864,887 B2 | 3/2005 | Hux |
| 7,173,615 B2 | 2/2007 | Hux |
| 7,230,617 B2 | 6/2007 | Hux |
| 9,582,924 B2 | 2/2017 | McNabb |

(Continued)

FOREIGN PATENT DOCUMENTS

| | | |
|---|---|---|
| KR | 20160083905 | 7/2016 |
| WO | 2015102637 | 7/2015 |

*Primary Examiner* — Cindy Trandai
(74) *Attorney, Agent, or Firm* — Hanley, Flight and Zimmerman, LLC

(57) ABSTRACT

Apparatus, systems, methods, and articles of manufacture are disclosed for assigning a color to a point in three-dimensional (3D) video. An example system includes an aggregator to access data from real cameras, the data including spatial coordinates and colors for a plurality of two-dimensional (2D) points in video data captured by the real cameras. The aggregator is to create a point cloud correlating the 2D points to the 3D points. The example system also includes a selector to select a subset of the real cameras based on a position of a virtual camera. In addition, the example system includes an analyzer to: select a point from the point cloud in a field of view of the virtual camera; select one of the subset of real cameras having a non-occluded view of the point and a perspective closest to that of the virtual camera; and assign a color to the point based on color data associated with the selected one of the real cameras.

23 Claims, 7 Drawing Sheets

(56) References Cited

U.S. PATENT DOCUMENTS

| | | | |
|---|---|---|---|
| 2002/0158873 A1* | 10/2002 | Williamson | G06T 17/00 345/427 |
| 2003/0210243 A1 | 11/2003 | Hux | |
| 2004/0104935 A1* | 6/2004 | Williamson | G06T 15/20 715/757 |
| 2010/0207936 A1* | 8/2010 | Minear | G06T 7/30 345/419 |
| 2014/0192148 A1* | 7/2014 | Georgakis | H04N 13/161 348/42 |
| 2014/0212031 A1* | 7/2014 | Tytgat | G06T 7/251 382/154 |
| 2015/0317822 A1* | 11/2015 | Haimovitch-Yogev | H04N 13/218 345/419 |
| 2016/0035124 A1* | 2/2016 | Sinha | G06T 7/187 345/424 |
| 2017/0262972 A1 | 9/2017 | Adams et al. | |
| 2017/0336759 A1 | 11/2017 | Kanugo | |
| 2019/0051051 A1* | 2/2019 | Kaufman | G06F 3/01 |
| 2019/0096125 A1* | 3/2019 | Schulter | G06T 15/20 |
| 2019/0318458 A1* | 10/2019 | Sabater | H04N 5/247 |
| 2019/0318536 A1* | 10/2019 | Nemetz | G06T 17/05 |
| 2020/0020155 A1* | 1/2020 | Duka | G06T 15/20 |
| 2020/0118327 A1* | 4/2020 | Kawamata | G06T 17/20 |
| 2020/0118342 A1* | 4/2020 | Varshney | G06T 19/20 |
| 2020/0284913 A1* | 9/2020 | Amelot | B60W 50/14 |

\* cited by examiner

100

VOLUMETRIC VIDEO COLOR ASSIGNMENT

FIELD OF THE DISCLOSURE

This disclosure relates generally to volumetric video and, more particularly, to volumetric video color assignment.

BACKGROUND

Traditional video is viewed from one perspective—that of the camera. The video looks flat as soon as the viewer deviates from the point of view of the camera. Volumetric video captures a three-dimensional space enabling the video to be viewed from multiple perspectives.

BRIEF DESCRIPTION OF THE DRAWINGS

The figures are not to scale. Instead, features may be reduced or enlarged for clarity. In addition, the same reference numbers generally will be used throughout the drawing(s) and accompanying written description to refer to the same or like parts.

DETAILED DESCRIPTION

Volumetric video is an emerging format of video featuring video data (moving images) in three dimensions (3D). In volumetric video, the viewer's position is not tied to the perspective of a single camera. Rather, the viewer's perspective can move to any angle at any point. In volumetric video, the video will appear with depth regardless of the viewer's angle.

Throughout this patent, the terms "viewer(s)," "user(s)," "subject(s)," and "gamer(s)" are used interchangeably. The terms "point of view," "field of view," and "perspective" also are used interchangeably.

Volumetric video has many applications in entertainment, sports, gaming, virtual reality, augmented reality, etc. In some volumetric video applications, the viewer can select the point of view, can select multiple and/or changing points of views, can choose camera angles, and immerse themselves in the video to engage in the content. For example, a viewer watching a baseball game may be able to change the point of view to that of the pitcher, the batter, or elsewhere. In traditional or non-volumetric video, there may be one camera capturing one video from the pitcher's perspective, and a second camera capturing a second video from the batter's perspective. To change points of view, the viewer switches between the two videos. The viewer is also limited to perspectives aligned with the number of cameras recording the event. With a volumetric video, the viewer does not have these limitations, and the viewer can change their perspective to any angle within the same volumetric video.

In volumetric video, and all video, color is point of view dependent. Color depends on a source of light and, therefore, the color of a point on an object depends on the relative positioning of the point, the light source, and the viewer's or camera's perspective. Traditional video has static or baked color because the video offers two dimensions (2D) and the point of view does not deviate from the point of view of the camera. In volumetric video, there are multiple cameras, each of which has a 2D field of view based on the position of the camera and, thus, unique to the camera. The 2D fields of view from all of the cameras are compiled to form a 3D field of view. The color of an object may appear as one color to the perspective of one camera and a different color to the perspective of another camera. For example, a red hat appears as a bright red color when viewed from the perspective of a camera positioned between the hat and a light source, with the camera facing the hat. The red hat appears as a darker red color when viewed from the perspective of a camera facing the hat with the hat positioned between the camera and the light source. If the color from one camera is assigned to an object for all 3D points, the color appears static, which is not realistic.

Figure 1:
FIG. 1 is a schematic illustration of a video frame without volumetric video color assignment.

In some examples, when volumetric video is created from a plurality of real cameras, the real cameras remain in a static position. A virtual camera is created that moves through the 3D space that is created by the compilation of the fields of view of the real cameras. The virtual camera is able to adopt any perspective within the 3D space. The position of the virtual camera may be different than any of the real cameras. In such examples, the virtual camera does not have a color assignment for the pixels in the field of view aligned with any real camera. The objects presented in the field of view of such virtual camera appears without proper color as shown in the example of FIG. 1. The object 100 is shown without color, and without color, the object appears flat.

Disclosed herein are example apparatus, systems, articles of manufacture, and methods that provide camera view dependent color assignment to each point of a 3D space of a volumetric video. 2D video from a plurality of real cameras is compiled to form the 3D volumetric video. Every point in the 3D space is assigned a color based on the data from the real cameras and a position of a virtual camera. Further, the examples disclosed herein, enable real-time feedback and/or dynamic changes to assign colors that may change depending on a change in perspective to provide a realistic appearance to the objects of the volumetric video.

Figure 2:
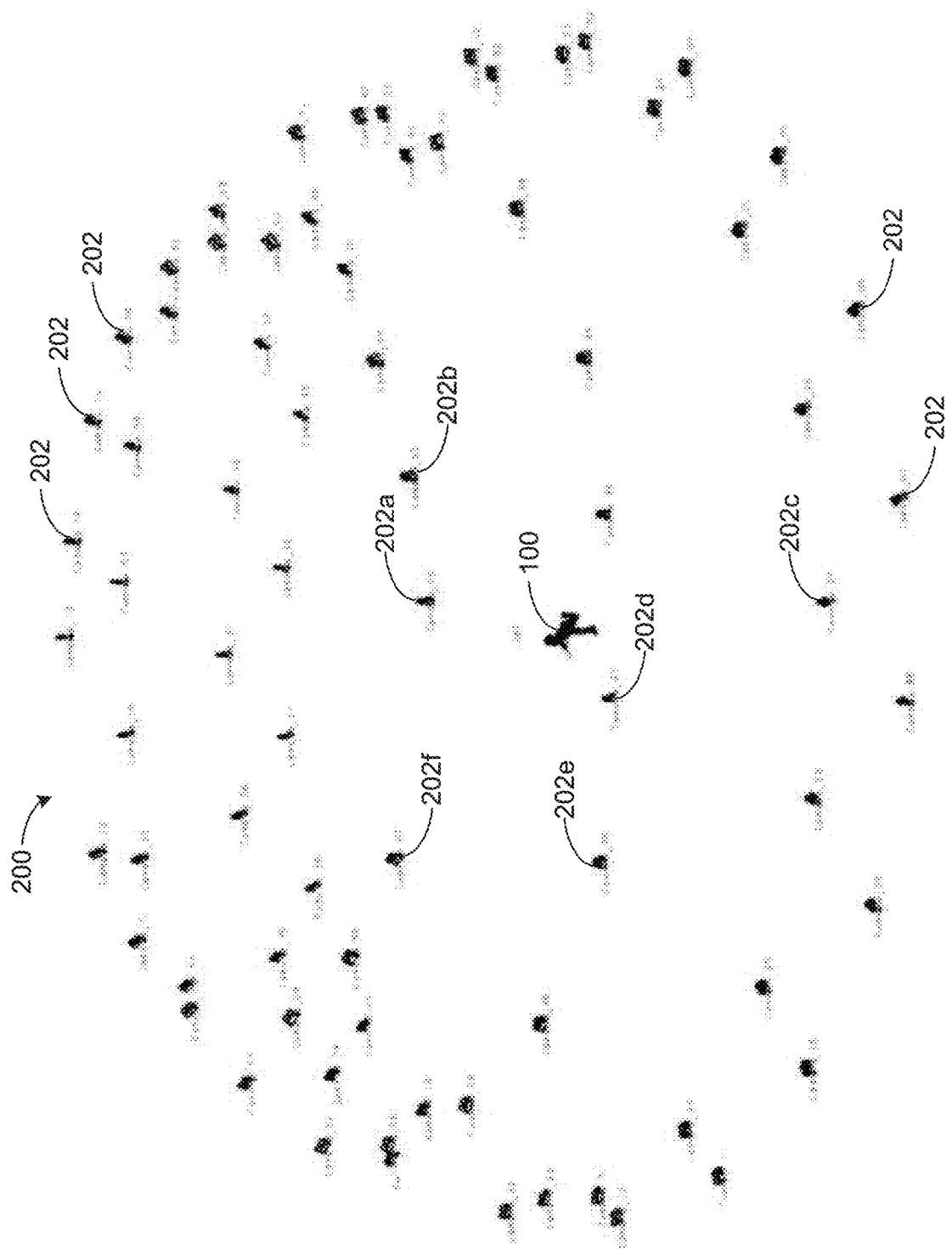
FIG. 2 is a schematic illustration of an example system used to capture example volumetric video in accordance with the teachings of this disclosure.

FIG. 2 is a schematic illustration of an example system 200 used to capture example volumetric video in accordance with the teachings of this disclosure. The example system 200 includes a plurality of real cameras 202 that are distributed about a 3D space to capture video. In some examples, the real cameras 202 are fixed stage cameras. In FIG. 2, the real cameras are generally labeled 202, with six of the real cameras labeled 202*a-f*. The designation 202 can refer to any of the real cameras, including any of the six real cameras 202a-f. The real cameras 202 are positioned to record video in the 3D space and, in the illustrated example, of the object 100. The example system 200 includes scores of other real cameras 202 distributed about the 3D space. Thus, in some examples, the different ones of the cameras 202 are positioned at different x, y, and z, coordinates throughout the 3D space. In some examples, there are forty real cameras, seventy-six real cameras, a hundred real cameras, etc. Another suitable or desired number of real cameras may be used. The data from the real cameras 202 in the system 200 is compiled into a point cloud.

Figure 3:
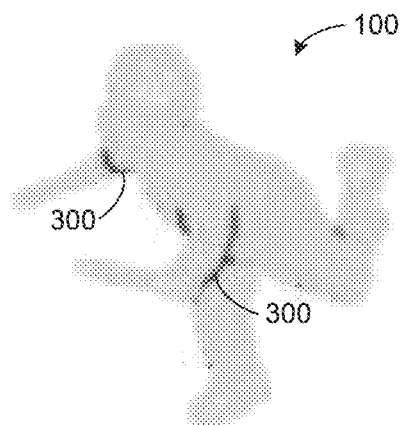
FIG. 3 is a schematic illustration of an example video frame captured from an example real camera of the example system of FIG. 2.

Data from different ones of the real cameras 202 may be used during different moments of the volumetric video. For example, data from the real camera 202d may be used to provide the perspective shown in FIG. 3. FIG. 3 also illustrates that some objects or portions of objects may be occluded, or not visible, from a perspective of a particular camera. For example, there are occluded areas 300 of the object 100 shown in FIG. 3. In this example, the object 100 is a man running, and the parts 300 of the man's body under his arms is occluded from the perspective of real camera 202d. Real camera 202d does not provide color information for the occluded portions 300.

Figure 4:
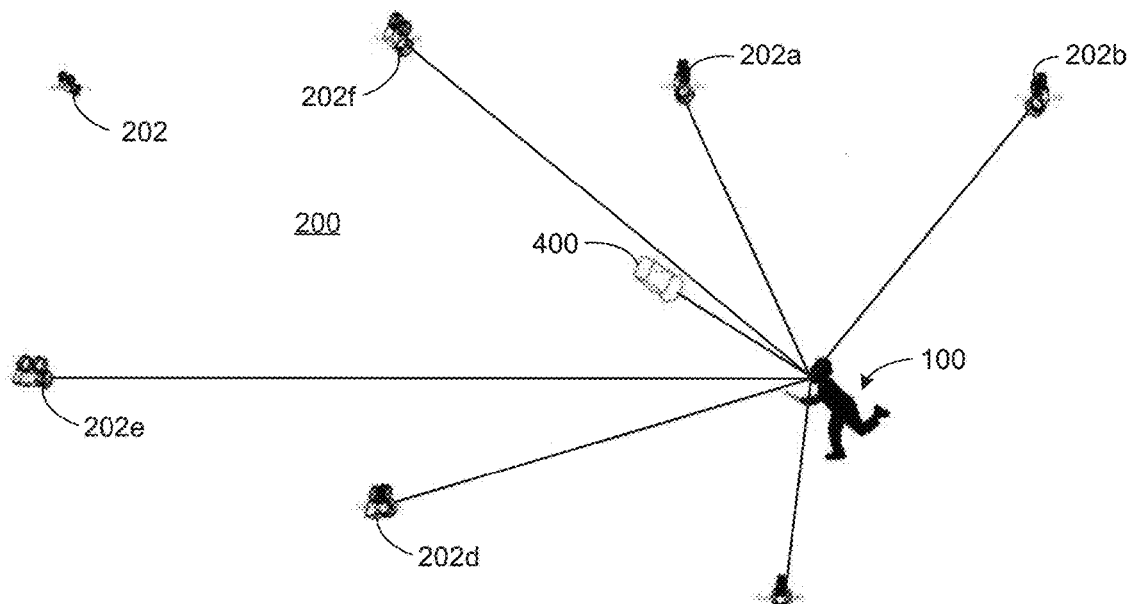
FIG. 4 is a schematic illustration of a portion of the example system of FIG. 2 with an example virtual camera.

FIG. 4 is a schematic illustration of a portion of the example system 200 of FIG. 2 with an example virtual camera 400. The virtual camera 400 may be used to create a perspective in the volumetric video that is not aligned with one of the real cameras 202. Creating a video output that shows the viewing perspective moving throughout the 3D space created by the system 200 uses many perspectives of the virtual camera 400 that do not align with one of the real cameras 202.

Figure 5:
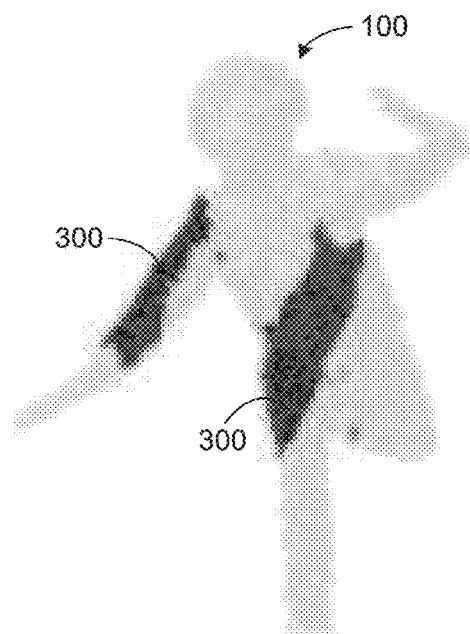
FIG. 5 is a schematic illustration of an example video frame captured from the example virtual camera of FIG. 4.

FIG. 5 is a schematic illustration of an example video frame captured from the example virtual camera 400. If the virtual camera 400 were to only use the data from the real camera 202d, there would be no color data for the occluded portions 300. The occluded portions 300 would appear, for example, as dark spots.

Figure 6:
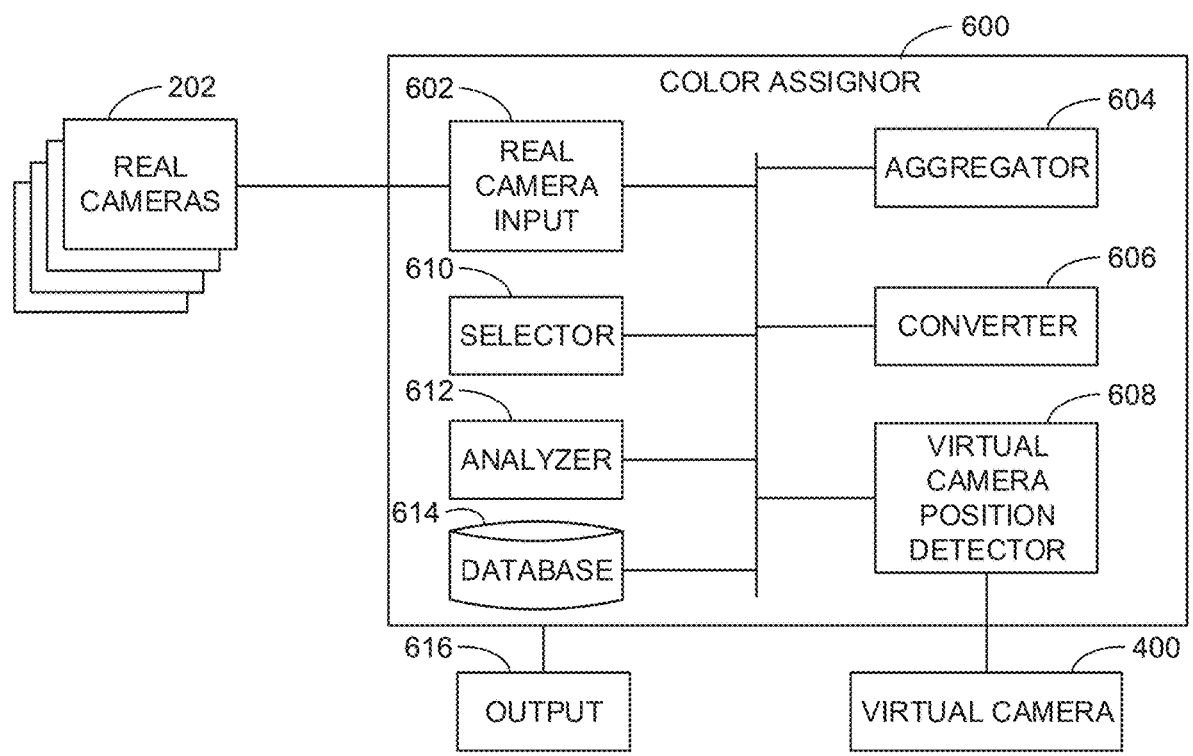
FIG. 6 is a block diagram of an example volumetric video color assignor in accordance with the teachings of this disclosure.

FIG. 6 is a block diagram of an example volumetric video color assignor 600 that provides color assignment to the points or pixels of a volumetric video. The color assignor 600 can be used to assign colors to all pixels, which can provide realistic color to visible objects, provide dynamic color assignments as objects or perspectives move, and provide color assignments when pixels may be occluded from one or more of the perspectives.

The example color assignor 600 includes an example real camera input 602, an example aggregator 604, an example converter 606, an example virtual camera position detector 608, an example selector 610, an example analyzer 612, and an example database 614.

The real cameras 202 capture footage or images including 2D video data or sequences from their respective positions. The pixels or points of the 2D video from the real cameras 202 are correlated or associated with spatial information including an x-coordinate and a y-coordinate. The points are also associated with a color identification. The color identification can be any suitable color scheme or nomenclature including, for example, colors identified by the RGB color model. The real cameras 202 record the x-coordinate, the y-coordinate, and the color identification for each pixel for each camera 202 and communicate the information to the color assignor 600 via the real camera input 602. The color assignor 600 stores the x-coordinate, the y-coordinate, and the color identification for each pixel for each camera 202 in the database 614.

The aggregator 604 compiles or aggregates the data from the real cameras 202 to create a point cloud. In some examples, the aggregator 604 implements the means for aggregating video data. The means for aggregating may be implemented by a processor such as the processor of FIG. 9 executing instructions such as the instructions of FIG. 8. The converter 606 converts the 2D data from each of the real cameras 202 into a 3D coordinate by assigning a z-coordinate to all of the pixels from each camera 202 based on the position of the camera 202 relative to other cameras 202 that are used to form the point cloud. In some examples, the converter 606 implements means for converting 2D video to 3D video. The means for converting may be implemented by a processor such as the processor of FIG. 9 executing instructions such as the instructions of FIG. 8. To accomplish the conversion, a 3D model or algorithm such as, for example, the toNDC Houdini function is used. The algorithm transforms the 3D point coordinates of the point cloud to 2D coordinates (pixels of the images of the real camera projections). The toNDC Houdini function includes:

vector toNDC(camera,point)

where camera is a point-of-view (POV) camera and point is the 3D position coordinates vector of the point cloud's point. The POV camera may be, for example, the virtual camera 400. The resulting vector returns the x-coordinate and y-coordinate pixel position in 2D space and the z-coordinate.

The aggregator 604 uses the 2D coordinates and the z-coordinate to obtain the color information for the relevant pixel. Each pixel in the 3D space, that is each point in the point cloud, has a color associated with the point for each of the real cameras 202 that can capture that point. Some points may not be visible to one or more of the cameras 202. Thus, there will be no color for that point associated with such cameras because the point is occluded from the POV of the camera. In some examples, there is a separate occlusion score, indicator, or value. Also, in some examples, the color for an occluded point is indicated as occluded, none, void, or the like.

In some examples, the occlusion score is generated by sending a ray from a point of the point cloud to one or more of the cameras. In some examples, a ray is sent from each point of the point cloud to each of the cameras. A temporary polygonal mesh is created that surrounds the point cloud. The polygonal mesh creates a detailed cage. If the ray hits the mesh more than one time, the point from which the ray is sent is determined to be occluded to the camera.

The database 614 stores the spatial coordinate, color, and occlusion information for each pixel for each of the real cameras 202. In an example system 200 in which there are seventy-six real cameras 202, each point in the point cloud has spatial coordinates, and a color identification or an occlusion indicator for each camera. Thus, each point has over 150 attributes. Depending on the resolution of the cameras 202, the 3D point cloud could have well over a hundred million points. These numbers are for one frame of the volumetric video. A two-hour film that presents twenty-four frames per second includes 172,800 frames. Thus, in this example, the volume of data is enormous with trillions of attributes over the course of the volumetric video. In another other example, the system 200 handles about two million points per frame. In such example, the volume of data includes hundreds of billions of attributes over the course of the volumetric video, depending on the length of the video. The color assignor 600 analyzes and processes these attributes to assign a color to a pixel based on the position of the virtual camera 400.

To determine the position of the virtual camera 400, the color assignor 600 includes the virtual camera position detector 608. The virtual camera position detector 608 gathers data related to the position and perspective of the virtual camera 400 in the 3D space of the system 200. The analyzer 612 identifies a point in the field of view of the virtual camera 400 based on the position of the virtual camera 400 that is to be assigned a color. The point is visible in many of the real cameras 202, and the analyzer 612 is to determine which of the real cameras 202 to use to obtain the color identification to assign to the point.

In some examples, the analyzer 612 selects one of the real cameras 202 to use to obtain the color assignment for a point in the volumetric video based on the proximity of the real camera 202 to the position of the virtual camera 400. For example, the real camera 202 closest to the position of the virtual camera 400 may be used for obtaining color assignment information. In other examples, as disclosed herein, the selection of the real camera 202 is based on the angular positions of the real cameras 202 relative to the position of the virtual camera 400.

To reduce the number cameras and, thus, the associated attributes to analyze, the selector 610 selects a subset, fraction, or portion of the plurality of real cameras 202 for analysis. The portion of real cameras 202 selected by the selector 610 is based on the position of the virtual camera 400 and the position of the point in the 3D space. For example, if the virtual camera 400 is positioned in front of a face of a person, and a point on the person's face is to be assigned a color, the selector 610 may eliminate all of the real cameras 202 positioned behind the person from analysis. The real cameras 202 positioned behind the person will likely be occluded or otherwise not positioned to provide a realistic color in view of the position of the virtual camera 400. Data from the remaining cameras 200 is analyzed by the analyzer 612.

FIG. 4 shows an example in which the virtual camera 400 is positioned in front of the object 100, here a person, and a point on the person's face is to be assigned a color. The analyzer 612 determines the normal line from the virtual camera 400 to the point to be assigned a color. The normal line from the virtual camera 400 to the point to be assigned a color is a reference normal line. The analyzer further determines the normal line from each camera 202 to the point. In some examples, the selector 610 selects real cameras 202 within a 180 degree arc of the virtual camera 400 or real cameras 202 that have a normal line to the point that is 90 degrees or less relative to the reference normal line. In some examples, the selector 610 selects approximately half of the real cameras 202 for further analysis. In other examples, other parameters may be used to reduce the number of real cameras 202 that to analyze.

The analyzer 612 reviews and compares the angles between each of the normal lines for the real cameras 202 and the reference normal line. The analyzer 612 selects the real camera 202 with the lowest angle. In some examples, the analyzer 612 creates a list or matrix of the real cameras 202 and associated normal angles. The data in the list or matrix is organized or ranked by the magnitude of the normal angles. The lowest angle is the angle with the smallest magnitude, which indicates the smallest difference between the normal line for the real camera 202 and the reference normal line. The subsequent or next lowest angle would be the angle with the second smallest magnitude.

By selecting the real camera 202 with the lowest angle, the analyzer 612 selects the real camera 202 with the perspective or POV that is most similar to that of the virtual camera 400. The real camera 202 closest in position to the virtual camera 400 provides a color most realistic and appropriate for the virtual camera. In the example of FIG. 4, the analyzer 612 selects real camera 202f for analysis. With the real camera 202 selected, the analyzer 612 determines if the point is occluded to the selected real camera 202. If the point is not occluded, the analyzer 612 assigns the color identification for that point from the selected real camera 202 to that point in the 3D space, that is in the volumetric video, for that position of the virtual camera 400.

If the point is occluded, the analyzer 612 selects the next real camera 202 with the second lowest angle. That is the analyzer 612 selects the next real camera 202 with the perspective or POV that is second-most similar to that of the virtual camera 400. In the example of FIG. 4, if the point to be assigned a color is occluded in the view from real camera 202f, the analyzer selects real camera 202e for analysis. The analyzer 612 cycles or advances through the real cameras 202 with progressively larger angles from the real camera's normal line to the normal line of the virtual camera 400 until a real camera 202 is found with a visible or un-occluded point.

Figure 7:
FIG. 7 is a schematic illustration of an example video frame after volumetric video color assignment in accordance with the teachings of this disclosure.

The analyzer 612 continues the analysis in sequence or simultaneously for multiple points of in the field of view for the virtual camera 400 in this position. In some examples, the analyzer 612 continues the analysis in sequence or simultaneously for every point in the field of view for the virtual camera 400 in this position. With each point assigned a color, the color assignor 600 sends the color information via an output 616 for presentation to a viewer. In some examples, the output 616 may be a screen or display. In some examples, the output 616 implements means for presenting a point with color. The means for presenting may be implemented by a processor such as the processor of FIG. 9 executing instructions such as the instructions of FIG. 8. FIG. 7 is a schematic illustration of an example video frame after volumetric video color assignment by the color assignor 606 to the object 100.

The color assignor 600 continues to assign colors to points in the 3D space as the virtual camera 400 moves through the 3D space. The perspective of the virtual camera 400 changes repeatedly throughout a video, for example, due to instruction of a film director. Thus, the color assignor 600 operates to provide updated color assignments to the points in the 3D space based on the best available non-occluded real camera 202 as the video progresses. In some examples, the color assignor 600 implements the means for assigning color. The means for assigning color may be implemented by a processor such as the processor of FIG. 9 executing instructions such as the instructions of FIG. 8.

In some examples, the color assignor 600 operates with real-time or near real-time feedback of the volumetric content including, for example, live events. In addition, the color assignor 600 dynamically updates color assignments dependent on the point of view. In some examples, the feedback or dynamic update of color assignment is dependent on multiple factors. For example, the size of the scene (the field of view), the number of players, performers, and/or objects are in the scene, movement, etc. In some examples, a frame can take fractions of a second (e.g., 0.5 seconds) to a few seconds (e.g., 3 seconds) for color assignment, depending on the details of these factors. Thus, in some examples, the color assignor 600 operates with a delay.

While an example manner of implementing the color assignor 600 is illustrated in FIG. 6, one or more of the elements, processes, and/or devices illustrated in FIG. 4 may be combined, divided, re-arranged, omitted, eliminated, and/or implemented in any other way. Further, the example real cameras 202, the example virtual camera 400, the example real camera input 602, the example aggregator 604, the example converter 606, the example virtual camera position detector 608, the example selector 610, the example analyzer 621, the example database 614, the example output 616, and/or, more generally, the example color assignor 600 of FIG. 6 may be implemented by hardware, software, firmware and/or any combination of hardware, software and/or firmware. Thus, for example, any of the example real cameras 202, the example virtual camera 400, the example real camera input 602, the example aggregator 604, the example converter 606, the example virtual camera position detector 608, the example selector 610, the example analyzer 621, the example database 614, the example output 616 and/or, more generally, the example color assignor 600 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example real cameras 202, the example virtual camera 400, the example real camera input 602, the example aggregator 604, the example converter 606, the example virtual camera position detector 608, the example selector 610, the example analyzer 621, the example database 614, the example output 616 and/or, the example color assignor 600 is/are hereby expressly defined to include a non-transitory computer readable storage device or storage disk such as a memory, a digital versatile disk (DVD), a compact disk (CD), a Blu-ray disk, etc. including the software and/or firmware. Further still, the example color assignor 600 of FIG. 6 may include one or more elements, processes, and/or devices in addition to, or instead of, those illustrated in FIG. 6, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
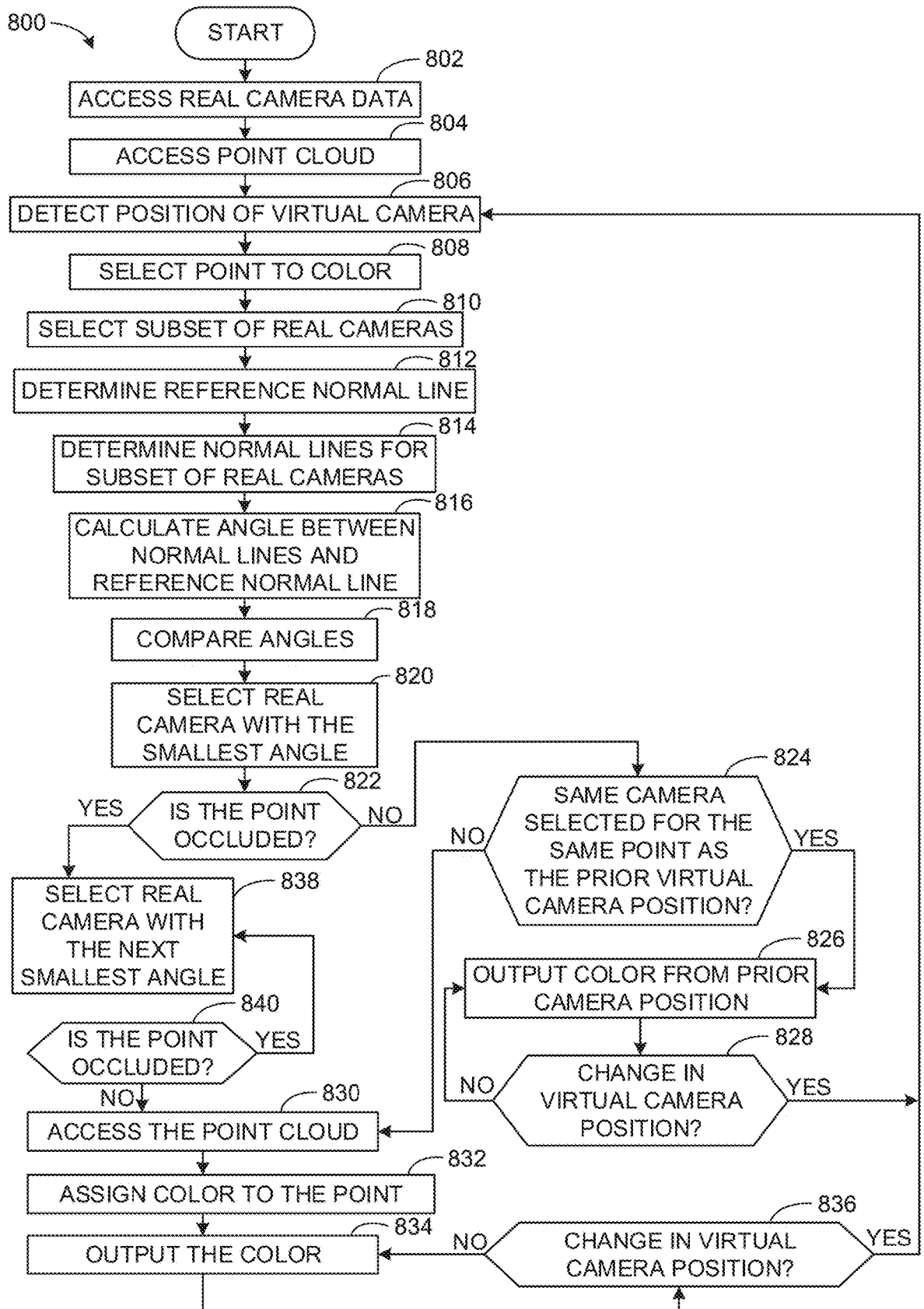
FIG. 8 is a flowchart representative of machine readable instructions in accordance with the teachings of this disclosure that may executed by the example volumetric video color assignor of FIG. 6.

A flowchart representative of example hardware logic, machine readable instructions, hardware implemented state machines, and/or any combination thereof for implementing the color assignor 600 of FIG. 6 is shown in FIG. 8. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example color assignor 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The example program 800 of FIG. 8 can be implemented to assign color to points in the field of view of a virtual camera such as, for example, the virtual camera 400 of FIG. 4. The example program 800 includes the color assignor 600 using the real camera input 602 to access real camera data (block 802). For example, the color assignor 600 receives data from real cameras 202 of system 200 via the real camera input 602. The converter 606 converts 2D data from the real cameras 202 into 3D data, and the aggregator 604 uses the data from the real cameras 202 and the converter 606 to form a point cloud, or the aggregator 604 accesses a point cloud (block 804).

The virtual camera position detector 608 of the color assignor 600 detects a position of the virtual camera 400 within the 3D space represented by the point cloud (block 806). For example, when producing a volumetric video, a film director may instruct movement of the virtual camera 400 about the 3D space, which simulates movement of a camera about the system 200 of FIG. 2. The position of the virtual camera 400 at any point in time can be detected during implementation of the example program 800.

The analyzer 612 selects a point in the field of view of the virtual camera 400 to assign a color (block 808). In some examples, the analyzer 612 selects a new point to assign color. In other examples, the analyzer 612 has assigned a point a color, but the position of the virtual camera has moved, and the analyzer 612 selects the same point to verify the color assignment and/or assign a new color. The selector 610 selects a subset of the real cameras 202 based on the position of the virtual camera 400 and the point to color (block 810). For example, the selector may select real cameras 202 within a 180 degree arc from the virtual camera 400 centered on the point. In some examples, the selector 610 selects half the real cameras 202 based on the position of the virtual camera 400 and the point to be assigned a color.

The analyzer 612 determines the normal line from the virtual camera 400 to the point to be assigned a color, which is a reference normal line (block 812). The analyzer 612 further determines the normal line for each of the cameras 202 of the selected subset to the point (block 814). In some examples, the analyzer 612 determines the normal lines for each camera before the selector 610 selects the subset of cameras 202, and the selector 610 selects the cameras 202 that have a normal line to the point that is 90 degrees or less relative to the reference normal line.

The analyzer 612 calculates the angles between the normal lines for the subset of cameras 202 and the reference normal line (block 816). The analyzer 612 reviews and compares the angles between the normal lines for the real cameras 202 and the reference normal line (block 818). The analyzer 612 selects the real camera 202 with the lowest or smallest angle (block 820). Thus, the analyzer 612 selects the real camera 202 with the perspective most similar to or approximate of that of the virtual camera 400. The real camera 202 with the smallest difference in position to the virtual camera 400 is selected.

With the real camera 202 selected (block 820), the analyzer 612 determines if the point is occluded to the selected real camera 202 (block 822). An occluded point is not be visible in the field of view of the real camera 202.

If the point is not occluded (block 822), the analyzer 612 determines if the selected camera is the same camera selected for the same point as the prior virtual camera position (block 824). For example, if the color assignor 600 is assigning color or verifying the color assignment for a point as the virtual camera 400 moves throughout the 3D space during a video, there are examples in which a point appears the same (i.e., same color) to the position of the virtual camera from one moment in the video to the next. In such examples, the same real camera provides color data for the point. Therefore, in such examples, the analyzer 612 determines that the selected camera is the same camera selected for the same point as the prior virtual camera position (block 824).

When the analyzer 612 determines that the selected camera is the same camera selected for the same point as the prior virtual camera position (block 824), the color of the point will not change and, therefore, the output continues to present the assigned color, which is the color output from the prior camera position (block 826).

The color assignor 600 continues to assign colors to points in the 3D space as the virtual camera 400 moves through the 3D space. Thus, the virtual camera position detector 608 determines if there is a change in the position of the virtual camera 400 (block 828). In some examples, if the position of the virtual camera 600 has not changed (block 828), the output 616 continues to present the assigned colors (block 826).

If the position of the virtual camera 400 has changed (block 828), the virtual camera position detector 608 detects the position of the virtual camera 400 (block 806). And the example program 800 continues to provide updated color assignments to the points in the 3D space based on the best available non-occluded real camera 202 as the video progresses.

If the analyzer determines that selected camera (block 820) is not the same camera selected for the same point as the prior virtual camera position (block 824), the analyzer 612 accesses the point cloud (block 830). That is, the analyzer 612 accesses the data stored in the database 614 from the real cameras 202 and identifies the point to be colored in the data for the selected real camera 202 (the real cameras 202 that has the lowest angle and unoccluded view). The analyzer assigns the color identification for that point from the real camera 202 to that point in the 3D space, that is in the volumetric video, for that position of the virtual camera 400 (block 832). The output 616 outputs or displays the point with that color (block 834).

As disclosed above, the color assignor 600 continues to assign colors to points in the 3D space as the virtual camera 400 moves through the 3D space. Thus, with the color assigned to a point, the virtual camera position detector 608 determines if there is a change in the position of the virtual camera 400 (block 836). In some examples, if the position of the virtual camera 600 has not changed (block 836), the output 616 continues to present the assigned colors (block 834). If the position of the virtual camera 400 has changed (block 836), the virtual camera position detector 608 detects the position of the virtual camera 400 (block 806). The example program 800 continues to provide updated color assignments to the points in the 3D space.

As disclosed above, the example program determines is a point when viewed through a selected camera (block 820) is occluded (block 822). If the point is occluded (block 822), the analyzer 612 selects the real camera 202 with the next smallest angle (block 838). That is the analyzer 612 selects the next real camera 202 with the perspective that is next-most similar to that of the virtual camera 400. The analyzer 612 determines if the point is occluded (block 840). If the point is occluded, the analyzer 612 cycles through the real cameras 202 with progressively larger angles from the real camera's normal line to the normal line of the virtual camera 400 (block 838, 840) until a real camera 202 is found with a visible or un-occluded point.

If the point is not occluded (block 840), the analyzer 612 accesses the point cloud (block 830). As disclosed above, the analyzer 612 accesses the data stored in the database 614 from the real cameras 202 and identifies the point to be colored in the data for the selected real camera 202 (the real cameras 202 that has the lowest angle and unoccluded view). The analyzer assigns the color identification for that point from the real camera 202 to that point in the 3D space, that is in the volumetric video, for that position of the virtual camera 400 (block 832). The output 616 outputs or displays the point with that color (block 834).

The color assignor 600 continues to assign colors to points in the 3D space as the virtual camera 400 moves through the 3D space, as disclosed above. The virtual camera position detector 608 determines if there is a change in the position of the virtual camera 400 (block 836), and the example program continues as detailed herein.

In addition, the color assignor 600 implements the example program shown in FIG. 8 in sequence or simultaneously for multiple (or all) points in the field of view for the virtual camera 400 in this position of the virtual camera 400. In some examples, the output 616 presents the points with respective assigned colors (blocks 826, 834) after the example program 800 has repeated operation and all the points to be assigned a color are assigned a color (blocks 808-832).

In some examples, if the position of the virtual camera 600 has not changed (blocks 828, 836), the color assignor 600 continues the example program over the course of time from the same position of the virtual camera 400 as one or more object(s) being filmed move.

Figure 9:
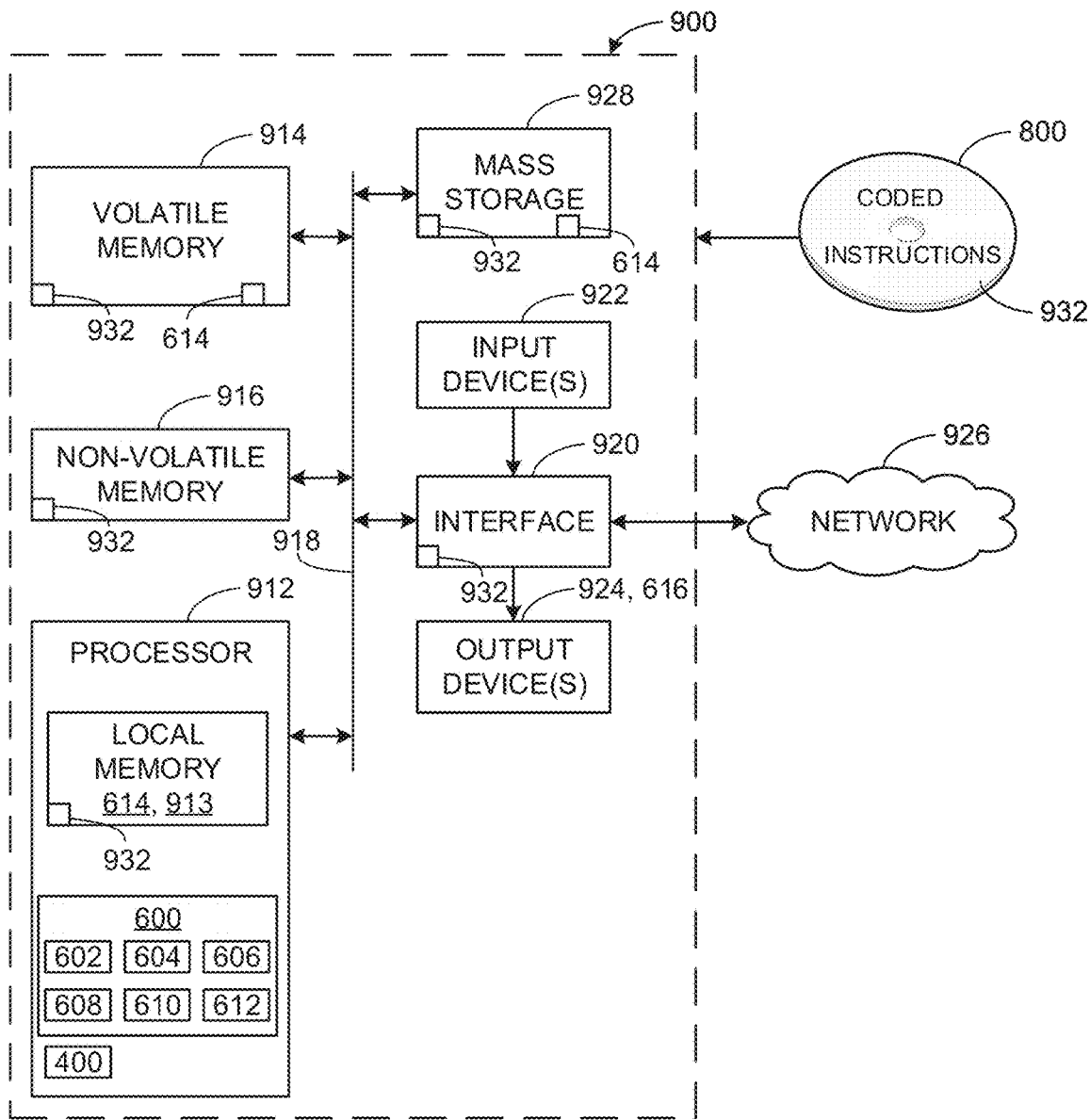
FIG. 9 is a block diagram of an example processing platform structured to execute the example instructions of FIG. 8 to implement the example volumetric video color assignor of FIG. 6.

FIG. 9 is a block diagram of an example processor platform 900 structured to execute the instructions of FIG. 8 to implement the color assignor 600 of FIG. 6. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the example color assignor 600, the example real camera input 602, the example aggregator, the example converter 606, the example virtual camera position detector 608, the example selector 6y10, the example analyzer 612, and the example virtual camera 400.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 8 may be stored in the mass storage device 928, in the volatile memory 914, in the non-volatile memory 916, and/or on a removable non-transitory computer readable storage medium such as a CD or DVD.

Volumetric video color assignment systems, methods, and articles of manufacture disclosed herein assign color to points of a volumetric video from the perspective of a virtual camera that form realistic images. The color assignments can change dynamically as the virtual camera moves through the 3D space of the volumetric video. In some examples, users of 3D applications can access a point cloud that includes color assignments for points in a 3D space. In some examples, the data in the point cloud is readily accessible such that a volumetric video is ready for playback by a user without the user having to share or otherwise supplement the video with additional content including additional footage, camera information, and/or stage information. The users can export from the 3D application passes, attributes, and/or outputs depending on their uses including, for example, broadcast, film, virtual reality, augmented reality, etc.

The disclosed systems, methods, apparatus and articles of manufacture improve the efficiency of using a computing device by reducing the volume of data to be analyzed to determine the most realistic color to assign to points of a video frame as the camera perspective changes throughout the progression of the video. In some examples, trillions of data points are excluded from analysis to arrive at the most realistic color for a point in the volumetric video. In addition, the examples disclosed herein are a significant improvement over conventional techniques because volumetric video is not produced with static or baked colors for points of the video. Rather, the systems and programs disclosed herein allow computing devices to produce accurate and realistic color assignments for points throughout a volumetric video. The disclosed methods, apparatus and articles of manufacture are accordingly directed to one or more improvement(s) in the functioning of a computer.

Apparatus, systems, methods, and articles of manufacture are disclosed for assigning a color to a point in three-dimensional (3D) video. Example 1 is a system that includes an aggregator to access data from real cameras, the data including spatial coordinates and colors for a plurality of two-dimensional (2D) points in video data captured by the real cameras. The aggregator is to create a point cloud correlating the 2D points to the 3D points. The system of Example 1 also includes a selector to select a subset of the real cameras based on a position of a virtual camera. In addition, the system of Example 1 includes an analyzer to: select a point from the point cloud in a field of view of the virtual camera; select one of the subset of real cameras having a non-occluded view of the point and a perspective closest to that of the virtual camera; and assign a color to the point based on color data associated with the selected one of the real cameras.

Example 2 includes the system of Example 1, wherein the analyzer is to select the selected one of the real cameras by: determining a reference normal line between the point and the virtual camera; accessing the point cloud for data from the subset of the plurality of real cameras; determining normal lines between the point and the real cameras of the subset of the plurality of real cameras; determining angles between the reference normal line and the normal lines of the real cameras of the subset of the plurality of real cameras; and selecting, as the selected one of the real cameras, a real camera of the subset of the plurality of real cameras that has a normal line that forms the lowest angle with the reference normal line.

Example 3 includes the system of Example 2, wherein the analyzer is to select the selected one of the real cameras by: determining if the point is occluded to the real camera; based on the point being occluded, proceeding with a succession of the next lowest angles until the analyzer determines that the point is visible; and based on the point being visible, selecting the real camera as the selected one of the real cameras.

Example 4 includes the system of Example 1, further including an output device to present the point with the color.

Example 5 includes the system of Example 1, where the selector is to select the subset of the plurality of real cameras based on an angle of the real camera relative to the position of the virtual camera.

Example 6 includes the system of Example 5, wherein the selector is to select the subset of the plurality of real cameras by selecting real cameras having angles less than 90 degrees relative to a reference normal line of the virtual camera.

Example 7 includes the system of Example 1, wherein the subset of real cameras is about half of the real cameras.

Example 8 includes the system of Example 1, wherein the spatial coordinates include an x-coordinate and a y-coordinate, the system further including a converter to convert the 2D video to 3D video by assigning a z-reference value to the 2D points based on the point cloud.

Example 9 includes the system of Example 1, wherein the position of the virtual camera is a first position, the subset of the plurality of real cameras is a first subset of the plurality of real cameras, the color is a first color, and based on movement of the virtual camera: the selector is to select a second subset of the plurality of real cameras based on a second position of the virtual camera; and the analyzer is to: select a second one of the second subset of real cameras having a non-occluded view of the point and a perspective closest to that of the virtual camera; and assign a second color to the point based on color data associated with the second selected one of the cameras.

Example 10 includes the system of Example 9, wherein the analyzer is to select the second selected one of the real cameras by: determining a reference normal line between the point and the virtual camera; accessing the point cloud for data from the second subset of the plurality of real cameras; determining normal lines between the point and the real cameras of the second subset of the plurality of real cameras; determine angles between the reference normal line and the normal lines of the real cameras of the second subset of the plurality of real cameras; and selecting, as the second selected one of the real cameras, a real camera of the second subset of the plurality of real cameras that has a normal line that forms the lowest angle with the reference normal line.

Example 11 includes the system of Example 10, wherein the analyzer is to select the second selected one of the real cameras by: determining if the point is occluded to the real camera of the second subset of the plurality of real cameras; based on the point being occluded, proceed with a succession of the next lowest angles until the analyzer determines that the point is visible; and based on the point being visible, identifying the real camera as the second selected one of the real cameras.

Example 12 includes the system of Example 9, wherein the second color is the first color if the second selected one of the real cameras to which the point was visible from the second position is the same real camera as the first selected one of the real cameras to which the point was visible from the first position, and the second color is different than the first color if the second selected one of the real cameras to which the point was visible from the second position is different than the first selected one of the real cameras to which the point was visible from the first position.

Example 13 includes the system of Example 9, wherein the first position occurs at a first point in time and the second position occurs at a second point in time.

Example 14 includes the system of Example 8, wherein the first color and the second color are different such that the point appears as the first color when the virtual camera is the first position and the point appears as the second color when the virtual camera is in the second position.

Example 15 is a system to assign a color to a point in three-dimensional (3D) video. The system of Example 15 includes means for aggregating video data that is to: access data from a plurality of real cameras, the data including spatial coordinates and colors for a plurality of two-dimensional (2D) points in video data captured by the real cameras; and create a point cloud correlating the 2D points to the 3D points. The system of Example 15 also includes means for assigning color to points of the 3D video by: selecting a subset of the plurality of real cameras based on a position of a virtual camera; selecting a point from the point cloud in the field of view of the virtual camera; selecting one of the real cameras of the subset of real cameras having a non-occluded view of the point and a perspective closest to that of the virtual camera; and assigning a color to the point based on color data associated with the selected one of the real cameras.

Example 16 includes the system of Example 15, wherein the means for assigning color is to assign color to points of the 3D video by: determining a reference normal line between the point and the virtual camera; accessing the point cloud for data from the subset of the plurality of real cameras; determining normal lines between the point and the real cameras of the subset of the plurality of real cameras; determining angles between the reference normal line and the normal lines of the real cameras of the subset of the plurality of real cameras; selecting a real camera of the subset of the plurality of real cameras that has a normal line that forms the lowest angle with the reference normal line; determining if the point is occluded to the real camera; based on the point being occluded, proceed with a succession of the next lowest angles until the analyzer determines that the point is visible; and based on the point being visible, selecting the real camera as the selected one of the real cameras.

Example 17 includes the system of Example 15, further including means for presenting the point with the color.

Example 18 includes the system of Example 15, where the means for assigning color to points of the 3D video is to select the subset of the plurality of real cameras based on angle of the real camera to the position of the virtual camera.

Example 19 includes the system of Example 18, wherein the means for assigning color to points of the 3D video is to select the subset of the plurality of real cameras having angles less than 90 degrees relative to a reference normal line of the virtual camera.

Example 20 includes the system of Example 15, wherein the subset of real cameras is about half of the real cameras.

Example 21 includes the system of Example 15, wherein the spatial coordinates include an x-coordinate and a y-coordinate, the system further including means for converting the 2D video to 3D video by assigning a z-reference value to the 2D points based on the point cloud.

Example 22 includes the system of Example 15, wherein the position of the virtual camera is a first position, the subset of the plurality of real cameras is a first subset of the plurality of real cameras, the color is a first color, and based on movement of the virtual camera, the means for assigning color to points of the 3D video is to: detect a second position of the virtual camera; select a second subset of the plurality of real cameras based on the second position of the virtual camera; determine a reference normal line between the point and the virtual camera; access the point cloud for data from the second subset of the plurality of real cameras; determine normal lines between the point and the real cameras of the second subset of the plurality of real cameras; determine angles between the reference normal line and the normal lines of the real cameras of the second subset of the plurality of real cameras; select a real camera of the second subset of the plurality of real cameras that has a normal line that forms the lowest angle with the reference normal line; determine if the point is occluded to the real camera of the second subset of the plurality of real cameras; based on the point being occluded, proceed with a succession of the next lowest angles until the analyzer determines that the point is visible; and based on the point being visible: access the data from the real camera to which the point was visible from the second position; and assign the first color to the point if the real camera to which the point was visible from the second position is the same real camera to which the point was visible from the first position; and assign a second color to the point if the real camera to which the point was visible from the second position is different than the real camera to which the point was visible from the first position.

Example 23 includes the system of Example 22, wherein the first position occurs at a first point in time and the second position occurs at a second point in time.

Example 24 includes the system of Example 22, wherein the first color and the second color are different such that the point appears as the first color when the virtual camera is the first position and the point appears as the second color when the virtual camera is in the second position.

Example 25 is a non-transitory computer readable storage medium that includes computer readable instructions that, when executed, cause one or more processors to, at least: access data from a plurality of real cameras, the data including spatial coordinates and colors for a plurality of two-dimensional (2D) points in video data captured by the real cameras; create a point cloud correlating the 2D points to three-dimensional (3D) points; select a subset of the plurality of real cameras based on a position of a virtual camera; select a point from the point cloud in the field of view of the virtual camera; select one of real cameras of the subset of real cameras having a non-occluded view of the point and a perspective closest to that of the virtual camera; and assign a color to the point based on color data associated with the selected one of the real cameras.

Example 26 includes the non-transitory computer readable storage medium of Example 25, wherein the instructions cause one or more processors to select the real camera by: determining a reference normal line between the point and the virtual camera; accessing the point cloud for data from the subset of the plurality of real cameras; determining normal lines between the point and the real cameras of the subset of the plurality of real cameras; determining angles between the reference normal line and the normal lines of the real cameras of the subset of the plurality of real cameras; selecting a real camera of the subset of the plurality of real cameras that has a normal line that forms the lowest angle with the reference normal line; determining if the point is occluded to the real camera; based on the point being occluded, proceeding with a succession of the next lowest angles until the analyzer determines that the point is visible; and based on the point being visible, selecting the real camera as the selected one of the real cameras.

Example 27 includes the non-transitory computer readable storage medium of Example 25, wherein the instructions further cause the one or more processors to initiate presentation of the point with the color.

Example 28 includes the non-transitory computer readable storage medium of Example 25, where the instructions cause the one or more processors to select the subset of the plurality of real cameras based on angle of the real camera to the position of the virtual camera.

Example 29 includes the non-transitory computer readable storage medium of Example 28, wherein the instructions cause the one or more processors to select the subset of the plurality of real cameras by selecting real cameras having angles less than 90 degrees relative to a reference normal line of the virtual camera.

Example 30 includes the non-transitory computer readable storage medium of Example 25, wherein the subset of real cameras is about half of the real cameras.

Example 31 includes the non-transitory computer readable storage medium of Example 25, wherein the spatial coordinates include an x-coordinate and a y-coordinate, and the instructions cause the one or more processors to convert the 2D video to 3D video by assigning a z-reference value to the 2D points based on the point cloud.

Example 32 includes the non-transitory computer readable storage medium of Example 25, wherein the position of the virtual camera is a first position, the subset of the plurality of real cameras is a first subset of the plurality of real cameras, the color is a first color, and based on movement of the virtual camera, the instructions cause the one or more processors to: detect a second position of the virtual camera; select a second subset of the plurality of real cameras based on the second position of the virtual camera; determine a reference normal line between the point and the virtual camera; access the point cloud for data from the second subset of the plurality of real cameras; determine normal lines between the point and the real cameras of the second subset of the plurality of real cameras; determine angles between the reference normal line and the normal lines of the real cameras of the second subset of the plurality of real cameras; select a real camera of the second subset of the plurality of real cameras that has a normal line that forms the lowest angle with the reference normal line; determine if the point is occluded to the real camera of the second subset of the plurality of real cameras; based on the point being occluded, proceed with a succession of the next lowest angles until the analyzer determines that the point is visible; and based on the point being visible: access the data from the real camera to which the point was visible from the second position; and assign the first color to the point if the real camera to which the point was visible from the second position is the same real camera to which the point was visible from the first position; and assign a second color to the point if the real camera to which the point was visible from the second position is different than the real camera to which the point was visible from the first position.

Example 33 includes the non-transitory computer readable storage medium of Example 32, wherein the first position occurs at a first point in time and the second position occurs at a second point in time.

Example 34 includes the non-transitory computer readable storage medium of Example 32, wherein the first color and the second color are different such that the point appears as the first color when the virtual camera is the first position and the point appears as the second color when the virtual camera is in the second position.

Example 35 is a method that includes accessing, by executing instructions with a processor, data from a plurality of real cameras, the data including spatial coordinates and colors for a plurality of two-dimensional (2D) points in video data captured by the real cameras; creating, by executing instructions with a processor, a point cloud correlating the 2D points to three-dimensional (3D) points; selecting, by executing instructions with a processor, a subset of the plurality of real cameras based on a position of a virtual camera; selecting, by executing instructions with a processor, a point in the field of view of the virtual camera; selecting, by executing instructions with a processor, one of the real cameras of the subset of real cameras having a non-occluded view of the point and a perspective closest to that of the virtual camera; and assigning, by executing instructions with a processor, a color to the point based on color data associated with the selected one of the real cameras.

Example 36 includes the method of Example 35, wherein selecting the real camera includes: determining, by executing instructions with a processor, a reference normal line between the point and the virtual camera; accessing, by executing instructions with a processor, the point cloud for data from the subset of the plurality of real cameras; determining, by executing instructions with a processor, normal lines between the point and the real cameras of the subset of the plurality of real cameras; determining, by executing instructions with a processor, angles between the reference normal line and the normal lines of the real cameras of the subset of the plurality of real cameras; selecting, by executing instructions with a processor, a real camera of the subset of the plurality of real cameras that has a normal line that forms the lowest angle with the reference normal line; determining, by executing instructions with a processor, if the point is occluded to the real camera; based on the point being occluded, proceeding, by executing instructions with a processor, with a succession of the next lowest angles until the analyzer determines that the point is visible; and based on the point being visible, selecting the real camera as the selected one of the real cameras.

Example 37 includes the method of Example 35, further including presenting the point with the color.

Example 38 includes the method of Example 35, wherein selecting the subset of the plurality of real cameras is based on an angle of the real camera to the position of the virtual camera.

Example 39 includes the method of Example 38, wherein selecting the subset of the plurality of real cameras includes selecting the real cameras having angles less than 90 degrees relative to a reference normal line of the virtual camera.

Example 40 includes the method of Example 35, wherein the subset of real cameras is about half of the real cameras.

Example 41 includes the method of Example 35, wherein the spatial coordinates include an x-coordinate and a y-coordinate, and the method further includes converting the 2D video to 3D video by assigning a z-reference value to the 2D points based on the point cloud.

Example 42 includes the method of Example 35, wherein the position of the virtual camera is a first position, the subset of the plurality of real cameras is a first subset of the plurality of real cameras, the color is a first color, and based on movement of the virtual camera, the method further including: detecting, by executing instructions with a processor, a second position of the virtual camera; selecting, by executing instructions with a processor, a second subset of the plurality of real cameras based on the second position of the virtual camera; determining, by executing instructions with a processor, a reference normal line between the point and the virtual camera; accessing, by executing instructions with a processor, the point cloud for data from the second subset of the plurality of real cameras; determining, by executing instructions with a processor, normal lines between the point and the real cameras of the second subset of the plurality of real cameras; determining, by executing instructions with a processor, angles between the reference normal line and the normal lines of the real cameras of the second subset of the plurality of real cameras; selecting, by executing instructions with a processor, a real camera of the second subset of the plurality of real cameras that has a normal line that forms the lowest angle with the reference normal line; determining, by executing instructions with a processor, if the point is occluded to the real camera of the second subset of the plurality of real cameras; based on the point being occluded, proceeding, by executing instructions with a processor, with a succession of the next lowest angles until the analyzer determines that the point is visible; and based on the point being visible: accessing, by executing instructions with a processor, the data from the real camera to which the point was visible from the second position; and assigning, by executing instructions with a processor, the first color to the point if the real camera to which the point was visible from the second position is the same real camera to which the point was visible from the first position; and assigning, by executing instructions with a processor, a second color to the point if the real camera to which the point was visible from the second position is different than the real camera to which the point was visible from the first position.

Example 43 includes the method of Example 42, wherein the first position occurs at a first point in time and the second position occurs at a second point in time.

Example 44 includes the method of Example 42, wherein the first color and the second color are different such that the point appears as the first color when the virtual camera is the first position and the point appears as the second color when the virtual camera is in the second position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system to assign a color to a point in three-dimensional (3D) video, the system comprising:
    an aggregator to:
        access data from real cameras, the data including spatial coordinates and colors for a plurality of two-dimensional (2D) points in video data captured by the real cameras; and
        create a point cloud correlating the 2D points to 3D points;
    a selector to:
        select a first subset of the real cameras based on a first position of a virtual camera; and
        based on movement of the virtual camera from the first position to a second position, select a second subset of the plurality of real cameras based on the second position of the virtual camera;
    an analyzer to:
        select a point from the point cloud in a field of view of the virtual camera;
        select a first real camera of the first subset of real cameras having a non-occluded view of the point and a perspective closest to that of the virtual camera in the first position;
        assign a first color to the point based on color data associated with the first real camera;
        select, based on movement of the virtual camera from the first position to the second position, a second real camera of the second subset of real cameras having a non-occluded view of the point and a perspective closest to that of the virtual camera in the second position; and
        assign a second color to the point based on color data associated with the second camera,
            the second color is the first color when the second real camera from which the point was visible from the second position is the same real camera as the first real camera from which the point was visible from the first position, and
            the second color is different than the first color when the second real camera from which the point was visible from the second position is different than the first real camera from which the point was visible from the first position.

2. The system of claim 1, wherein the analyzer is to select the first real camera by:
    determining a reference normal line between the point and the virtual camera;
    accessing the point cloud for data from the first subset of the plurality of real cameras;
    determining normal lines between the point and the real cameras of the first subset of the plurality of real cameras;
    determining angles between the reference normal line and the normal lines of the real cameras of the first subset of the plurality of real cameras; and
    selecting, as the first real camera, a real camera of the first subset of the plurality of real cameras that has a normal line that forms the lowest angle with the reference normal line.

3. The system of claim 2, wherein the analyzer is to select the first real camera by:
    determining if the point is occluded to the real camera;
    based on the point being occluded, proceeding with a succession of the next lowest angles until the analyzer determines that the point is visible; and
    based on the point being visible, selecting the real camera as the first real camera.

4. The system of claim 1, further including an output device to present the point with the first color or the second color.

5. The system of claim 1, where the selector is to select the first subset of the plurality of real cameras based on an angle of the real camera relative to the first position of the virtual camera.

6. The system of claim 5, wherein the selector is to select the first subset of the plurality of real cameras by selecting real cameras having angles less than 90 degrees relative to a reference normal line of the virtual camera.

7. The system of claim 1, wherein the first subset of real cameras is about half of the real cameras.

8. The system of claim 1, wherein the spatial coordinates include an x-coordinate and a y-coordinate, the system further including a converter to convert the 2D video to 3D video by assigning a z-reference value to the 2D points based on the point cloud.

9. The system of claim 8, wherein the first color and the second color are different such that the point appears as the first color when the virtual camera is the first position and the point appears as the second color when the virtual camera is in the second position.

10. The system of claim 1, wherein the analyzer is to select the second real camera by:
    determining a reference normal line between the point and the virtual camera;
    accessing the point cloud for data from the second subset of the plurality of real cameras;
    determining normal lines between the point and the real cameras of the second subset of the plurality of real cameras;
    determine angles between the reference normal line and the normal lines of the real cameras of the second subset of the plurality of real cameras; and
    selecting, as the second real camera, a real camera of the second subset of the plurality of real cameras that has a normal line that forms the lowest angle with the reference normal line.

11. The system of claim 10, wherein the analyzer is to select the second real camera:
    determining if the point is occluded to the real camera of the second subset of the plurality of real cameras;

based on the point being occluded, proceed with a succession of the next lowest angles until the analyzer determines that the point is visible; and based on the point being visible, identifying the real camera as the second real camera.

12. The system of claim 1, wherein the first position occurs at a first point in time and the second position occurs at a second point in time.

13. A system to assign a color to a point in three-dimensional (3D) video, the system comprising:
  means for aggregating video data that is to:
    access data from a plurality of real cameras, the data including spatial coordinates and colors for a plurality of two-dimensional (2D) points in video data captured by the real cameras; and
    create a point cloud correlating the 2D points to 3D points; and
  means for assigning color to points of the 3D video by:
    selecting a first subset of the plurality of real cameras based on a first position of a virtual camera;
    selecting a point from the point cloud in a field of view of the virtual camera;
    selecting a first real camera of the first subset of real cameras having a non-occluded view of the point and a perspective closest to that of the virtual camera in the first position; and
    assigning a first color to the point based on color data associated with the first camera; and
  based on movement of the virtual camera from the first position to a second position:
    the means for aggregating is to select a second subset of the plurality of real cameras based on the second position of the virtual camera; and
    the means for assigning is to:
      select a second real camera of the second subset of real cameras having a non-occluded view of the point and a perspective closest to that of the virtual camera in the second position; and
      assign a second color to the point based on color data associated with the second real camera,
        the second color is the first color when the second real camera from which the point was visible from the second position is the same real camera as the first real camera from which the point was visible from the first position, and
        the second color is different than the first color when the second real camera from which the point was visible from the second position is different than the first real camera from which the point was visible from the first position.

14. The system of claim 13, wherein the means for assigning color is to assign the first color to points of the 3D video by:
  determining a reference normal line between the point and the virtual camera;
  accessing the point cloud for data from the first subset of the plurality of real cameras;
  determining normal lines between the point and the real cameras of the first subset of the plurality of real cameras;
  determining angles between the reference normal line and the normal lines of the real cameras of the first subset of the plurality of real cameras;
  selecting a real camera of the first subset of the plurality of real cameras that has a normal line that forms the lowest angle with the reference normal line;
  determining if the point is occluded to the real camera;

based on the point being occluded, proceed with a succession of the next lowest angles until the analyzer determines that the point is visible; and based on the point being visible, selecting the real camera as the first real camera.

15. The system of claim 13, wherein the means for assigning color to points of the 3D video is to select the first subset of the plurality of real cameras having angles less than 90 degrees relative to a reference normal line of the virtual camera.

16. The system of claim 13, wherein the means for assigning color to points of the 3D video is to select the second real camera by:
  determining a reference normal line between the point and the virtual camera;
  accessing the point cloud for data from the second subset of the plurality of real cameras;
  determining normal lines between the point and the real cameras of the second subset of the plurality of real cameras;
  determining angles between the reference normal line and the normal lines of the real cameras of the second subset of the plurality of real cameras;
  selecting a real camera of the second subset of the plurality of real cameras that has a normal line that forms the lowest angle with the reference normal line;
  determining if the point is occluded to the real camera of the second subset of the plurality of real cameras;
  based on the point being occluded, proceeding with a succession of the next lowest angles until the analyzer determines that the point is visible; and
  based on the point being visible, identifying the real camera as the second real camera.

17. A non-transitory computer readable storage medium comprising computer readable instructions that, when executed, cause one or more processors to, at least:
  access data from a plurality of real cameras, the data including spatial coordinates and colors for a plurality of two-dimensional (2D) points in video data captured by the real cameras;
  create a point cloud correlating the 2D points to three-dimensional (3D) points;
  select a first subset of the plurality of real cameras based on a first position of a virtual camera;
  select a point from the point cloud in a field of view of the virtual camera;
  select a first real camera of the first subset of real cameras having a non-occluded view of the point and a perspective closest to that of the virtual camera;
  assign a first color to the point based on color data associated with the first real camera; and
  based on movement of the virtual camera from the first position to a second position:
    select a second subset of the plurality of real cameras based on the second position of the virtual camera;
    select a second real camera of the second subset of real cameras having a non-occluded view of the point and a perspective closest to that of the virtual camera in the second position; and
    assign a second color to the point based on color data associated with the second real camera,
      the second color is the first color when the second real camera from which the point was visible from the second position is the same real camera as the first real camera from which the point was visible from the first position, and the second color is different than the first color when the second real camera from which the point was visible from the second position is different than the first real camera from which the point was visible from the first position.

18. The non-transitory computer readable storage medium of claim 17, wherein the instructions cause one or more processors to select the first real camera by:
   determining a reference normal line between the point and the virtual camera;
   accessing the point cloud for data from the first subset of the plurality of real cameras;
   determining normal lines between the point and the real cameras of the first subset of the plurality of real cameras;
   determining angles between the reference normal line and the normal lines of the real cameras of the first subset of the plurality of real cameras;
   selecting a real camera of the first subset of the plurality of real cameras that has a normal line that forms the lowest angle with the reference normal line;
   determining if the point is occluded to the real camera;
   based on the point being occluded, proceeding with a succession of the next lowest angles until the analyzer determines that the point is visible; and
   based on the point being visible, selecting the real camera as the first real camera.

19. The non-transitory computer readable storage medium of claim 17, where the instructions cause the one or more processors to select the first subset of the plurality of real cameras based on angle of the real camera to the position of the virtual camera.

20. The non-transitory computer readable storage medium of claim 19, wherein the instructions cause the one or more processors to select the first subset of the plurality of real cameras by selecting real cameras having angles less than 90 degrees relative to a reference normal line of the virtual camera.

21. The non-transitory computer readable storage medium of claim 17, wherein the instructions cause the one or more processors to select the second real camera by:
   determining a reference normal line between the point and the virtual camera;
   accessing the point cloud for data from the second subset of the plurality of real cameras;
   determining normal lines between the point and the real cameras of the second subset of the plurality of real cameras;
   determining angles between the reference normal line and the normal lines of the real cameras of the second subset of the plurality of real cameras;
   selecting a real camera of the second subset of the plurality of real cameras that has a normal line that forms the lowest angle with the reference normal line;
   determining if the point is occluded to the real camera of the second subset of the plurality of real cameras;
   based on the point being occluded, proceeding with a succession of the next lowest angles until the analyzer determines that the point is visible; and
   based on the point being visible, identifying the real camera as the second real camera.

22. A method comprising:
   accessing, by executing instructions with a processor, data from a plurality of real cameras, the data including spatial coordinates and colors for a plurality of two-dimensional (2D) points in video data captured by the real cameras;
   creating, by executing instructions with a processor, a point cloud correlating the 2D points to three-dimensional (3D) points;
   selecting, by executing instructions with a processor, a first subset of the plurality of real cameras based on a first position of a virtual camera;
   selecting, by executing instructions with a processor, a point in a field of view of the virtual camera;
   selecting, by executing instructions with a processor, a first real camera of the first subset of real cameras having a non-occluded view of the point and a perspective closest to that of the virtual camera;
   assigning, by executing instructions with a processor, a first color to the point based on color data associated with the first real camera; and
   based on movement of the virtual camera from the first position to a second position:
      selecting, by executing instructions with a processor, a second subset of the plurality of real cameras based on a second position of the virtual camera;
      selecting, by executing instructions with a processor, a second real camera of the second subset of real cameras having a non-occluded view of the point and a perspective closest to that of the virtual camera in the second position; and
      assigning, by executing instructions with a processor, a second color to the point based on color data associated with the second real camera,
         the second color is the first color when the second real camera from which the point was visible from the second position is the same real camera as the first real camera from which the point was visible from the first position, and
         the second color is different than the first color when the second real camera from which the point was visible from the second position is different than the first real camera from which the point was visible from the first position.

23. The method of claim 22, wherein selecting the first real camera includes:
   determining, by executing instructions with a processor, a reference normal line between the point and the virtual camera;
   accessing, by executing instructions with a processor, the point cloud for data from the first subset of the plurality of real cameras;
   determining, by executing instructions with a processor, normal lines between the point and the real cameras of the first subset of the plurality of real cameras;
   determining, by executing instructions with a processor, angles between the reference normal line and the normal lines of the real cameras of the first subset of the plurality of real cameras;
   selecting, by executing instructions with a processor, a real camera of the first subset of the plurality of real cameras that has a normal line that forms the lowest angle with the reference normal line;
   determining, by executing instructions with a processor, if the point is occluded to the real camera;
   based on the point being occluded, proceeding, by executing instructions with a processor, with a succession of the next lowest angles until the analyzer determines that the point is visible; and
   based on the point being visible, selecting the real camera as the first real camera.

* * * * *